Dec. 20, 1960 R. W. COUFFER, JR., ET AL 2,965,132
PNEUMATIC CONTROL VALVE
Filed Aug. 8, 1958 4 Sheets-Sheet 3

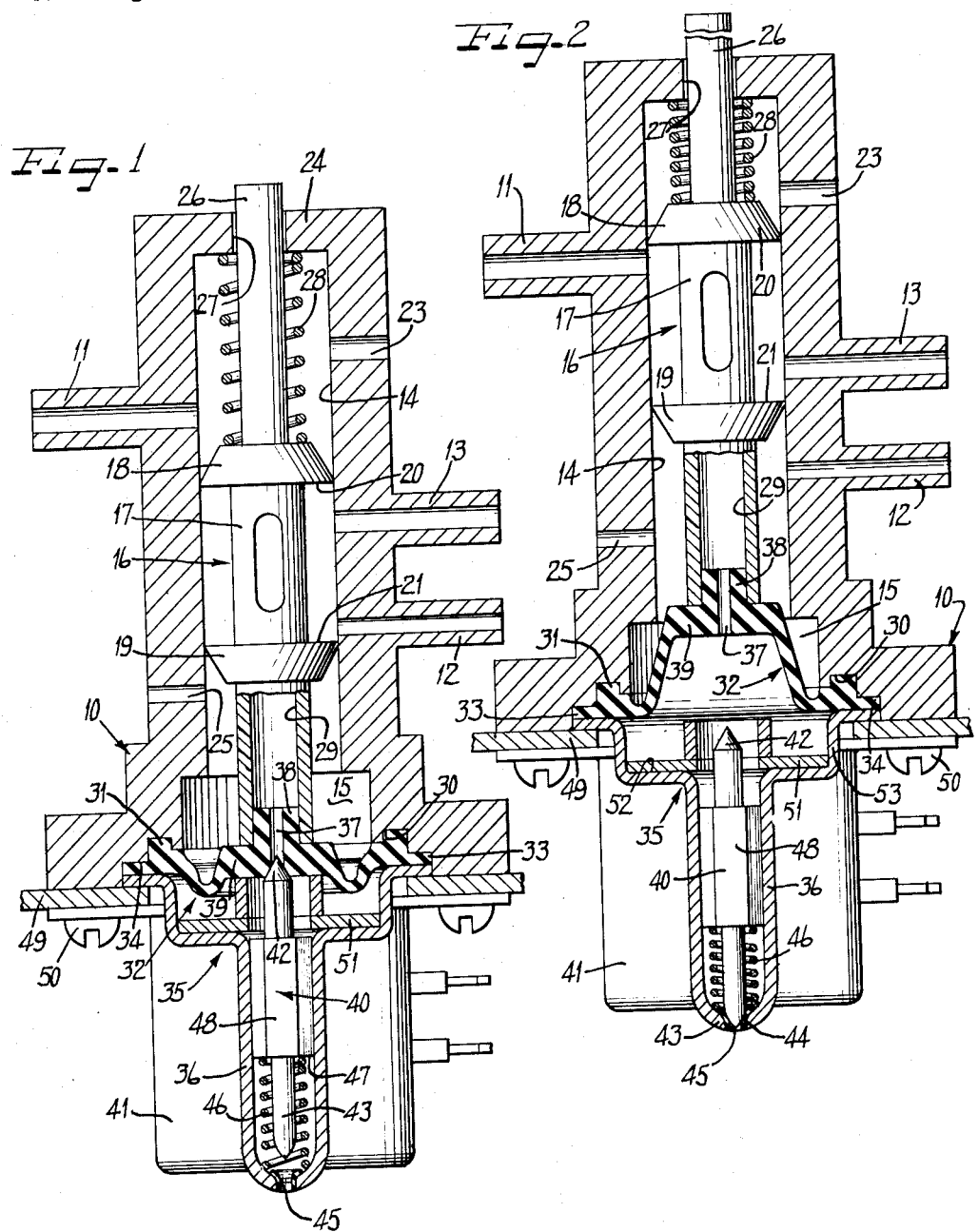

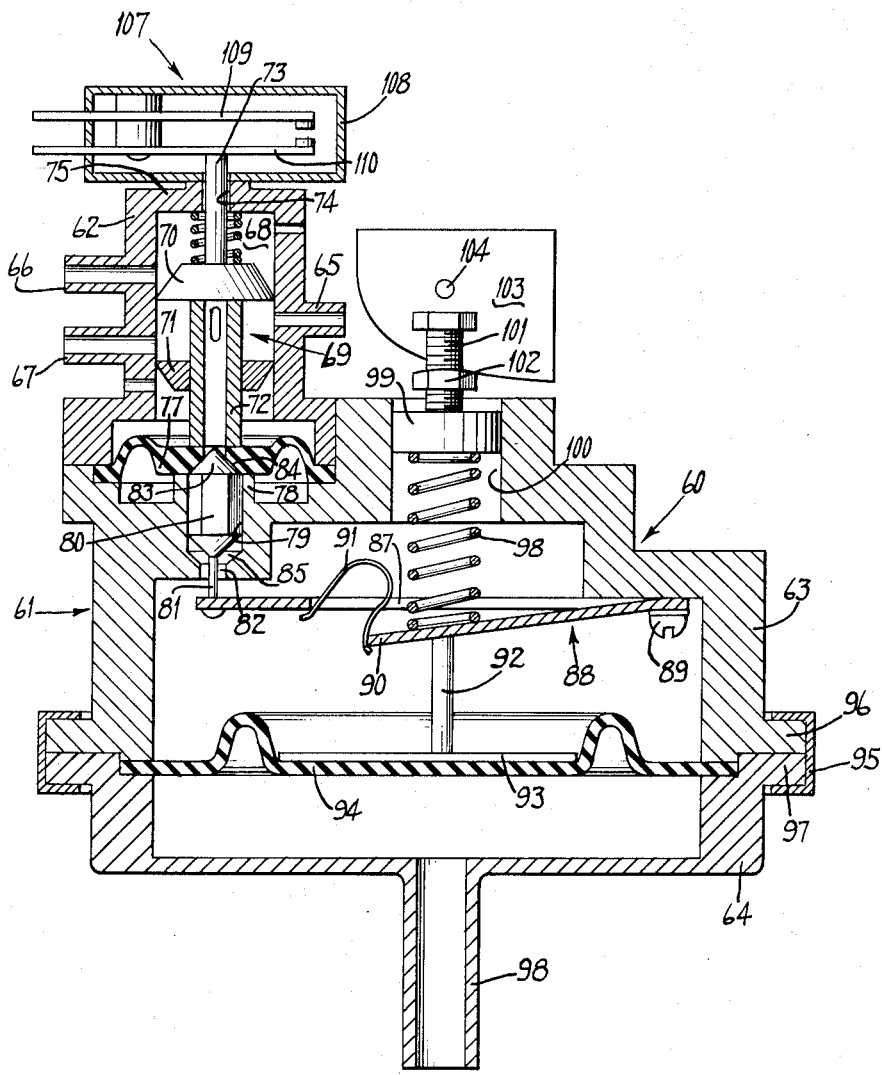

Inventors
Robert W. Couffer Jr.
Wesley L. Taylor
by Hill Sherman Meroni Gross + Simpson Attys Dec. 20, 1960 R. W. COUFFER, JR., ET AL 2,965,132
PNEUMATIC CONTROL VALVE
Filed Aug. 8, 1958 4 Sheets-Sheet 4

Inventors
Robert W. Couffer Jr.
Wesley L. Taylor
by Hill Sherman Meroni Gross & Simpson
Attys

United States Patent Office 2,965,132
Patented Dec. 20, 1960

2,965,132

PNEUMATIC CONTROL VALVE

Robert W. Couffer, Jr., Oak Park, and Wesley L. Taylor, Glenview, Ill., assignors to The Dole Valve Company, Morton Grove, Ill., a corporation of Illinois Filed Aug. 8, 1958, Ser. No. 754,100

9 Claims. (Cl. 137—622)

This invention relates to control valves and more particularly relates to fluid control valves which are arranged to be electro-pneumatically or pneumatically actuated.

In recent times there has been an increasing production of mechanisms which are designed to be pneumatically or electro-pneumatically actuated such, for instance, as mixing valves and agitator mechanisms in washing machines. Since it is obviously quite expensive to provide separate control valves for each of the pneumatically actuatable mechanisms, it has been found desirable to provide a single central pneumatic fluid control valve for controlling the actuation of each of a plurality of pneumatically actuatable mechanisms.

Accordingly, applicants provide a pneumatic control valve having an air inlet and a plurality of air outlets and having a slidable spool valve intermediate the inlet and the outlets arranged to selectively communicate the inlet with one or more of the outlets. The slidable spool valve may be entirely pneumatically actuated when used in conjunction with a pressure switch such as those which are associated with washing machines and the like wherein pneumatic pressure is directed to the switch as a function of the weight, and consequently the level of the water or other fluid within the washing machine tub. Since, however, applicants' pneumatic control valve is not limited to use in washing machines and the like, applicants provide a means for electro-pneumatically actuating the slidable spool valve so that applicants' fluid control valve may be used in conjunction with any mechanism having a plurality of pneumatically actuatable mechanisms therein.

In each of the embodiments of the present invention a spring and a flexible diaphragm are connected to opposed ends of the spool valve so that the spool valve is normally biased into a position to communicate the inlet with the first outlet. A fluid passageway is formed through the diaphragm which, when opened, admits air therepast from the inlet to the outer side of the diaphragm, which forms one wall of a pressure chamber, so that the diaphragm and spool valve are moved against the biasing force of the spring to a second position to communicate the inlet with a second outlet and to close communication between the inlet and the first mentioned outlet.

The passageway leading through the diaphragm is controllably opened and closed by means of a pilot valve which, in turn, may be solenoid controlled or, in the alternative, operated by an over-center snap mechanism such as might be coupled with a pressure switch associated with a washing machine.

Thus, in two of the embodiments herein shown and described a fluid pressure operated over-center snap acting mechanism is provided to operate the diaphragm passage pilot control valve for the diaphragm disclosed above which, in turn, is operatively associated with and controls the movement of a main spool valve.

Accordingly, it is a principal object of the present invention to provide a pneumatic control valve for controlling the actuation of a plurality of pneumatically actuatable mechanisms.

It is another object of the present invention to provide a pneumatic control valve having a single inlet and a plurality of outlets and a pneumatically actuatable spool valve arranged to communicate the inlet with one or more of the outlets.

A further object of the present invention is to provide a fluid control valve of the type above described wherein the slidable spool valve is connected to a diaphragm which diaphragm is arranged to be moved by pneumatic pressure in an axial direction with respect to said spool valve.

A further and important object of the present invention is to provide a fluid control valve of the type above described wherein the slidable spool valve is connected to a diaphragm which is arranged to be moved by pneumatic pressure passing through a central passageway formed therein, and wherein a reciprocally movable pilot valve is associated with the diaphragm passageway and wherein a solenoid is associated with the pilot valve for controlling the reciprocal movement thereof.

Yet another object of the present invention is to provide a fluid control valve of the type above described wherein the slidable spool valve is connected to a diaphragm, which is arranged to be moved coaxially with respect to the spool valve by pneumatic pressure passing through a passageway formed therein, wherein fluid flow through the passageway is controlled by means of a reciprocally movable pilot and wherein the reciprocable movement of the pilot valve is controlled by means of a pressure operated over-center snap mechanism coupled therewith.

These and other objects of the present invention will become apparent from time to time as the following specification proceeds and with reference to the accompanying drawings wherein:

Figure 1 is a vertical sectional view through a pneumatic control valve constructed in accordance with the principles of the present invention and showing the spool valve in one position;

Figure 2 is a vertical sectional view through a pneumatic fluid control valve constructed in accordance with the principles of the present invention and similar to Figure 1 but showing the spool valve in another position;

Figure 3 is a vertical sectional view of a pressure switch embodying the principles of the present invention;

Figure 4:
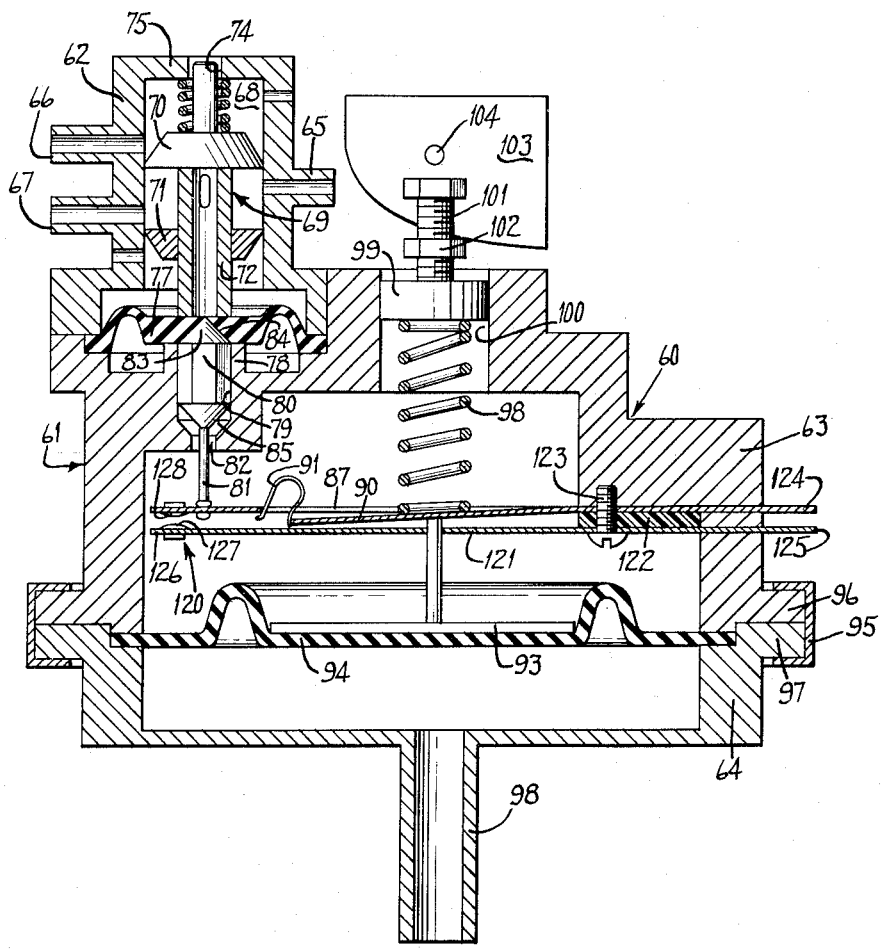
Figure 4 is a vertical sectional view of a pressure switch embodying the principles of the present invention similar to the switch illustrated in Figure 3 but showing a different means for operating an electrical switch connected therewith.
Figure 5:
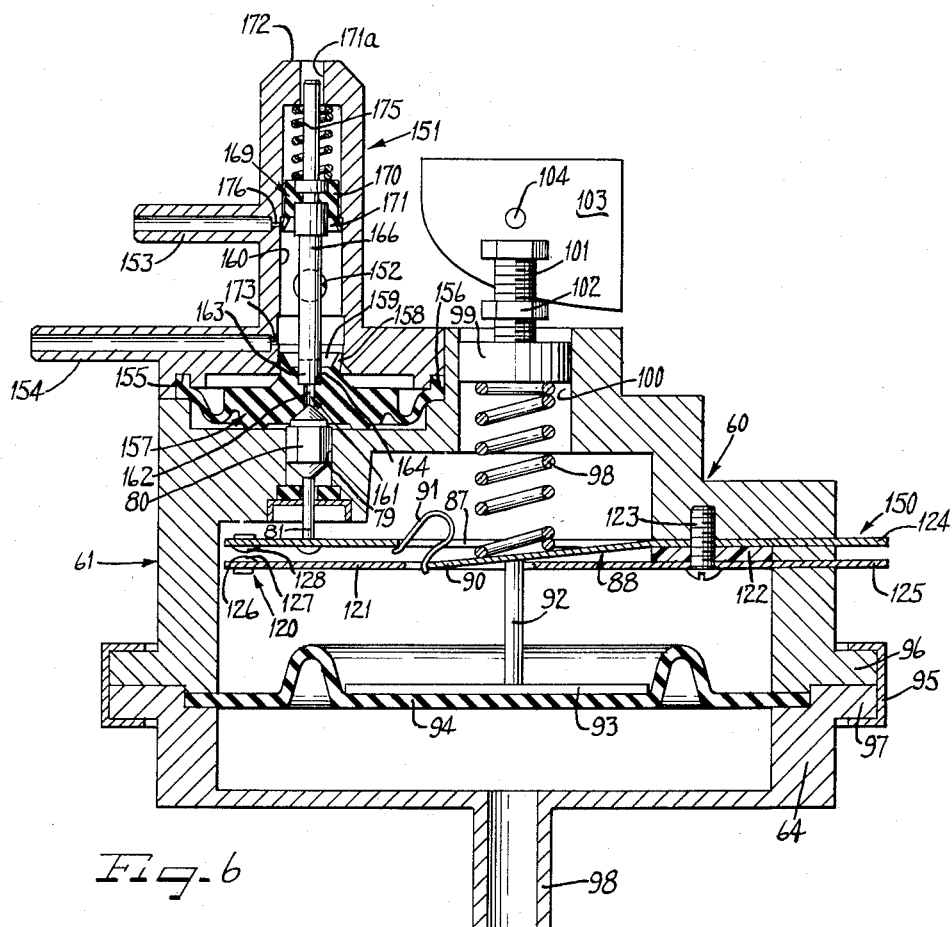
Figure 6:
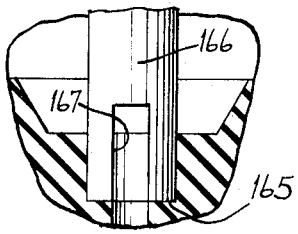

Figure 5 is a vertical sectional view through a pressure switch constructed in accordance with the principles of the present invention which is a different embodiment of the invention than those illustrated in Figures 3 and 4 showing a means for controlling movement of the spool or piston valve with a non-tubular connector; and Figure 6 is an enlarged fragmentary view of the base portion of the non-tubular connector illustrated in Figure 5.

In the embodiment of the invention illustrated in Figures 1 and 2 there is shown a valve body 10 having a pair of outlets 11 and 12 and having an inlet 13 intermediate the outlets. The inlet 13 and each of the outlets 11 and 12 open to an elongated cylinder 14 within the valve body 10 which, in turn, opens at the lower end thereof, to a radially enlarged vent chamber 15.

A spool valve 16 comprising a tubular connector 17 and a pair of flexible valve members 18 and 19 is slidably disposed within the cylinder 14. The connector 17 is of such a length that the inner faces 20 and 21 of the valve members 18 and 19, respectively, are spaced from one another a distance less than that between the outlet 11 and the outlet 12 but greater than that between the inlet 13 and either of the outlets for reasons which will hereinafter become apparent. Furthermore, each of the valve members 18 and 19 are frustro-conical in shape and have their radially enlarged inner faces 20 and 21 disposed toward one another.

It will now be apparent that when the spool valve is in the position illustrated in Figure 1 pneumatic pressure will be communicated from the inlet 13 to the outlet 12 and that the outlet 11 will be communicated with a vent 23 which opens to the cylinder 14 through the side wall of the valve body 10 at a point intermediate the outlet 11 and the closed end 24 of the valve body 10. When, however, the spool valve 16 is moved to the position illustrated in Figure 2 the outlet 11 is placed in direct open communication with the inlet 13 and the valve member 18 lies intermediate the outlet 11 and the vent 23 so that pressurized fluid such as air is directed to the outlet 11 from the inlet 13. It will further be noted that when the spool valve 16 is in the position illustrated in Figure 2, the valve member 19 lies intermediate the inlet 13 and the outlet 12 so that no pressurized air flowing to the inlet 13 is directed to the outlet 12 and that the outlet 12 is in direct open communication with a vent 25 which opens to the cylinder 14 through a side wall of the valve body 10 intermediate the outlet 12 and the lower end of the cylinder 14.

A guide stem 26 is connected to the valve member 18 and extends through a suitable aperture 27 in the closed end 24 of the valve body 10. A spring member 28 encircles the guide member 26 and abuts, at the upper end thereof, the inner wall of the closed end 24 of the valve body 10 and, at the other end, the upper surface of the frustro-conically shaped valve member 18 to bias the spool valve 16 into the position illustrated in Figure 1. The tubular connector 17 has a plurality of opposed slots 28 therein which open to a passageway 29 within the tubular connector 17 for reasons which will hereinafter become apparent.

An annular groove 30 is formed within the valve body 10 about the vent chamber 15 to receive an annular lip 31 of a flexible annular diaphragm 32. The peripheral annular edge 33 of the diaphragm 32 is arranged to seat upon an annular shoulder 34 of the valve body 10 and to be maintained in engagement therewith by an end closure cap 35 which has a centrally located, outwardly extending guide 36 extending therefrom. A central fluid passage 37 is formed within an upwardly extending stem 38 of the diaphragm 32 which is formed integrally with a central thickened portion 39 of the diaphragm 32. It will be noted that the stem 38 is sealed in fluid tight relation with the inner wall of the tubular connector 17 as by bonding or the like so that the connector 17 is arranged to move with the diaphragm 32.

An armature 40 of a solenoid 41 has a valve member 42 on one end thereof which is cooperable with the central fluid passageway 37 within the diaphragm 32 to control fluid flow therethrough. Similarly, a valve member 43 is formed on the opposite end of the armature and is cooperable with a resilient seat 44 defining a vent passage 45 extending through a wall of the end closure cap 35 at the lower end of the guide 36. An armature return spring 46 is disposed about the valve member 43 and abuts, at one end thereof, the lower end portion of the guide 36 and, at the other end thereof, a shoulder 47 formed by the octagonally shaped radially enlarged body portion 48 of the armature 40.

Assuming that the inlet 13 is connected to a source of pressurized air, it will be noted that when the parts of the control valve are in the position illustrated in Figure 1 air will be communicated through the inlet 13, into the cylinder 14, and thence to the outlet 12. In this position the outlet 11 will be in open communication with the vent 23 so that no pressurized air will be directed thereto. However, when the solenoid 41 which is connected to an end closure cap securing bracket 49 which is in turn connected to the valve body 10 by a plurality of screws 50, is energized the armature 40 will be moved downwardly within the guide 36 to unseat the valve member 42 from the central passageway 37 within the diaphragm 32 and to thereafter seat the valve member 43 against the resilient seat 44 defining the vent outlet 45. In this manner air will flow from the inlet 13 through the slots or apertures 28, into the passage 29, through the central fluid passage 37, and thence to the underside of the diaphragm 32. Since the upper side of the diaphragm 32 is vented to the atmosphere through the vent 25, the pressure differential across the diaphragm 32 will cause movement of the diaphragm, the connector 17, and the guide stem 26 upwardly against the biasing force of the spring member 28 to close communication between the inlet 13 and the outlet 12 and open communication between the inlet and the outlet 11. Thus, the outlet 12 will be vented to the atmosphere through the vent 25.

Upon deenergization of the solenoid 41, the armature 40 will be moved upwardly within the guide 36 by the return spring 46 thus unseating the valve member 43 from the resilient seat 44 defining the vent outlet 45 so that air will escape from the underside of the flexible diaphragm 32 between the wall of the guide 36 and the octagonally shaped armature 48 to the vent 45 to thus reduce the pressure on the underside of the diaphragm 32. As the pressure differential across the diaphragm 32 is thus decreased, the spring member 28 will act to move the spool valve 16 and the diaphragm 32 downwardly to the position illustrated within Figure 1.

To prevent the diaphragm 32 from following the retractable movement of the armature 40 when the solenoid 41 is energized an abutment member 51 is seated against a shoulder 52 formed intermediate the guide 36 and the radially enlarged base portion 53 of the enclosure cap 35.

Obviously, one or more pneumatically actuatable devices may be connected to each of the outlets from the control valve body so that each of the mechanisms so connected to one of the outlets will be actuated at the same time. Thus, applicant has provided a relatively simple fluid control valve for controlling the actuation of a plurality of pneumatically actuatable devices which may be economically and expeditiously manufactured.

Referring now more particularly to Figure 3 of the drawings there is shown a pressure switch 60 comprising a three-part valve body 61 including an upper section 62 an intermediate section 63 and a lower section 64. The upper section 62 is similar in configuration to the valve body 10 illustrated in Figures 1 and 2 and includes an inlet 65 and spaced outlets 66 and 67 which open to a cylinder 68. As with the embodiment of the invention illustrated in Figures 1 and 2 a spool valve 69 including valve members 70 and 71 is mounted on a tubular connector 72 and is arranged for slidable movement within the cylinder 68. Similarly, a guide stem 73 extends upwardly from the valve member 70 and is slidably received within a suitable receiving aperture 74 in the upper closed end 75 of the upper section 62. A flexible annular diaphragm 77 is disposed at the lower end of the upper section 62 and is maintained in engagement with the lower annular wall portion thereof by abutment with the intermediate section 63. The diaphragm 77 is, of course, suitably secured to the connector 72 as by bonding or the like for coaxial movement therewith.

In the embodiment of the invention illustrated in Figure 3 an abutment lip 78 is provided for the diaphragm 77 which is formed integrally with the intermediate section 63 and which defines a guide chamber 79 for a double ended valve member 80. The valve member 80 is preferably of octagonal or hexagonal shape so that air can pass between the valve member 80 and the rounded side wall of the guide 79.

The valve member 80 is, however, mechanically actuated and not electrically actuated as was the armature 40 illustrated in Figures 1 and 2 and has a stem 81 depending therefrom which has an outer diameter substantially smaller than the inner diameter of a vent aperture 82 at the lower end of the guide 79. As has already been described with particular reference to Figures 1 and 2 a valve member 83 at one end of the valve 80 is cooperable with a central fluid passage 84 within the flexible annular diaphragm 77 while a valve portion 85 of the valve 80 is cooperable with the vent passage 82 at the lower end of the guide passage 79 to control fluid flow therethrough.

The stem 81 is suitably connected to the snap lever 87 of a snap action mechanism 88 by insertion of the stem 81 through an aperture in the outer free end of the lever 87 (not shown) and thereafter peening the end of the stem 81 over the lever 87. One end of the snap action mechanism 88 is rigidly secured to the intermediate section 63 of the pressure switch 60 by a screw 89 so that the outer free ends of both the snap lever 87 and an integral snap blade 90 have relative freedom of movement. In a manner which is well known in the art the outer free end of the snap blade 90 is connected to the free end of the snap lever 87 by an overcenter spring 91 so that movement of the snap blade 90 above the plane of the snap lever 87 will cause the snap lever 87 to snap downwardly. Conversely, as the snap blade 90 moves downwardly past the plane of the snap lever 87 the lever 87 will be snapped upwardly again to the position illustrated in Figure 3 by the overcenter spring 91.

A motion translation rod 92 is connected at one end portion to the snap blade 90 and, at the other end portion, to a supporting blade 93 which is bonded or otherwise suitably secured to a flexible annular diaphragm 94 which, in turn, is peripherally engaged by intermediate and lower sections 63 and 64 of the pressure switch 60. A clamp 95 which is C shaped in cross section grips annular flanges 96 and 97 of the intermediate and lower sections 63 and 64, respectively, to seal the sections in fluid tight relation with one another.

It will now be noted that a connecting nipple 98 extends from the lower section 64 which is arranged to be connected to a pressure sensitive diaphragm (not shown) which may be associated with a washing machine tub. Such pressure sensitive diaphragms are located at the bottom of washing machine tubs so that when the level and consequently the weight of fluid within the tub increases the diaphragm will be moved downwardly to force the fluid thereunder through suitable tubing to a pressure switch such as the pressure switch 60 which forms the subject matter of the present invention.

A return spring 98 is disposed within the intermediate section 63 of the pressure switch 60 and abuts, at one end thereof, the snap blade 90 and, at the other end thereof, an abutment member 99 which may be slidably moved within a spring passage 100. A threaded post 101 having a cam follower 102 threadedly mounted thereon is connected to the abutment member 99 for corelative movement therewith. It will thus be understood that a cam 103 mounted on a cam shaft 104 for corotational movement therewith is arranged to vary the position of the abutment member 99 to thereby vary the spring force acting on the snap blade 90. The cam shaft 104 is, in turn, rotatably mounted in a suitable supporting bracket (not shown) and is arranged to be selectively manually operated.

Thus, as fluid pressure is built up on the underside of the diaphragm 94 in the manner hereinbefore described the diaphragm 94, the motion translation rod 92, and the free end of the snap blade 90 will be moved upwardly until the snap blade 90 is moved above the plane of the snap lever 87. When the snap blade 90 has moved above the plane of the snap lever 87 the blade 90 will be snapped upwardly and the lever 87 will be snapped downwardly in the manner hereinbefore described by the overcenter spring 91 to thus move the valve portion 83 of the valve 80 out of engagement with the central fluid passageway 84 within the diaphragm 77 and the valve portion 85 will move into engagement with the vent passage 82 to cause the diaphragm 77 and the spool valve 69 to be moved upwardly in the manner hereinbefore described with reference particularly to Figures 1 and 2. The outlet 67 will thus be vented to the atmosphere and the outlet 66 will be in open communication with the inlet 65.

It will further be noted that if so desired an electrical switch 107 comprising a casing 108 and stationary and movable contacts 109 and 110, respectively, may be provided at the upper end of the upper section 62 of the pressure switch 60 to provide a means for opening and closing an electrical circuit. The foregoing may be accomplished by connecting the guide stem 73 to either of the contacts 109 or 110 so that upward movement of the guide stem 73 causes opening or closing of the electrical circuit as desired.

In the embodiment of the invention illustrated in Figure 4 a pneumatically controlled valve structure is shown which is similar in nature to the structure illustrated in Figure 3 but which includes an electrical switch 120 instead of the switch 107 illustrated and described with respect to Figure 3.

The switch 120 comprises, in part, the snap action mechanism 88 and also includes a contact blade 121 which is seated at one end thereof on an insulation block 122 which lies intermediate the blade 121 and snap lever 87. A screw 123 extends through the blade 121, the block 122, the lever 87 and is threadedly mounted in the intermediate section 63 of the valve body 61 to secure the snap lever and contact blade to the valve body. The lever 87 and the blade 121 each have rearwardly extending portions 124 and 125, respectively, which project from the valve body 61 and are adapted to be connected, as by soldering or the like, to electric power lines.

The inner free end 126 of the contact blade 121 has a contact button 127 mounted thereof which is arranged to engage a similar contact button 128 mounted on the inner free end of the snap lever 87 to close an electrical circuit.

Thus, when the diaphragm 93 and the snap action mechanism 88 are in the position illustrated in Figure 3 the contacts 127 and 128 will be out of engagement with one another and the electrical circuit through electrically conductive members 87 and 121 will be broken. When, however, the snap lever 87 and snap lever 90 have been moved to reverse positions by the upward movement of the diaphragm 94 the contacts 127 and 128 will be in contacting engagement with one another and the circuit through members 121 and 87 will be closed so that the mechanism electrically connected therewith, such as a timer, will be energized.

Referring now more particularly to the embodiment of the invention illustrated in Figure 5 a pressure switch 150 is shown as including an intermediate section 63 and a lower section 64 which are identical in construction with the sections 63 and 64 shown and described with respect to Figure 3. However, in this particular embodiment of the present invention the upper section 151, having an inlet 152 and a pair of spaced outlets 153 and 154 extending therefrom, is of somewhat different construction from the upper sections shown and described with respect to Figures 1 through 4.

The upper section 151 has an annular groove 155 extending around the base thereof which is arranged to receive an annular bead 156 formed integrally with a flexible diaphragm 157 about the periphery thereof. Thus, since the bead 156 of the diaphragm 157 is interposed between the upper section 151 and the intermediate section 63 when the former is seated on the latter a fluid tight seal is formed between each of the sections for reasons which will hereinafter become apparent.

It will be noted that in this particular embodiment of the invention the diaphragm 157 has an upstanding boss 158 formed integrally therewith which terminates in an annular skirt 159 arranged to slidably engage the inner wall of a bore 160. A central fluid passageway 161 extends through the diaphragm 157 and includes radially reduced and radially enlarged end portions 162 and 163.

A shoulder 164 is formed intermediate the radially reduced and radially enlarged end portions 162 and 163, respectively, of the central fluid passageway 161 which forms a seat for the inner end portion 165 of a connecting rod 166. It will be noted that the connecting rod 166 is slotted as at 167 and that the slot 167 extends upwardly within the connecting rod 166 a sufficient distance to openly communicate the interior of the bore 160 disposed above the diaphragm 157 with the radially reduced end portion 162 of the central fluid passageway 161.

A valve member 169 is mounted on the upper end of the connecting rod 166 and is similar in configuration to the boss 158 of the diaphragm 157. The valve member 169 has a body portion 170 and an integrally formed annular skirt 171 extending therefrom which is disposed in a direction toward the diaphragm 157.

The upper end of the connecting rod 166 is slidably received within an aperture 171a at the upper end 172 of the upper section 151 and forms, with the members 158 and 169, a spool valve slidably movable within the bore 160.

As is clearly shown in the drawings the valve members 158 and 169 are so spaced from one another that when the connecting rod 166 is in the position illustrated in Figure 5 the outlet 154 is communicable with the inlet 158 and the interior of the bore 160 through a port 173. It is further apparent that when the connecting rod 166 is moved upwardly within the bore 160 against the biasing force of spring member 175 which encircles the rod 166 and abuts the valve member 170, communication between the outlet 154 and the inlet 152 is closed by the annular skirt 159 which extends over the port 173, and the outlet 153 is communicated with the inlet 152 through a port 176.

It will now become apparent that the connecting rod 166 like the connectors 72 and 17 is moved reciprocably within the bore 160 by the fluid actuated movement of the diaphragm 157. However, in this particular embodiment of the invention a slot 167 is formed within the connector 166 to communicate air within the bore 160 intermediate the valve members 158 and 169 with the radially reduced portion 162 within the central fluid passageway 161.

The pressure switch 150 also includes an electrical switch 120 therein which is similar in nature to the switch shown in Figure 4 and which includes a contact blade 121 which is secured to an insulation block 122 which lies intermediate the blade 121 and snap lever 87. As with the sketch illustrated in Figure 4 the lever 87 and the blade 121 each have rearwardly extending portions 124 and 125, respectively, which project from the valve body 61 and are adapted to be connected to electric power lines.

Applicants have thus provided a pneumatic control valve which may be incorporated in a pressure switch such as the one illustrated in Figure 3 or which may be electro-pneumatically actuated and which may also be arranged to control opening and closing of an electrical switch in the manner hereinbefore described.

It will herein be understood that these embodiments of the invention have been used for illustrative purposes only and that variations and modifications may be made without departing from the spirit and scope of the novel concepts of the present invention.

We claim as our invention:

1. A fluid control valve comprising a valve body having spaced outlets and an inlet intermediate said outlets, a spool valve within said valve body operable to selectively communicate said inlet with said outlets, a diaphragm centrally connected on one side thereof to said spool valve, a pressurizing chamber formed on the opposite side thereof, a fluid passageway within said diaphragm, means for communicating pressurized fluid from said inlet to said passageway, a vent passage leading from said pressurizing chamber, and valve means cooperable with said fluid passageway and said vent passage to control fluid flow therethrough.

2. A fluid control valve comprising a valve body having spaced outlets and an inlet intermediate said outlets, a spool valve within said valve body operable to selectively communicate said inlet with said outlets, a diaphragm centrally connected on one side thereof to said spool valve, a pressurizing chamber formed on the opposite side thereof, a fluid passageway within said diaphragm, means for communicating pressurized fluid from said inlet to said passageway, a vent passage leading from said pressurizing chamber, a single valve member cooperable with said fluid passageway and said vent passage to control fluid flow therethrough, and means for actuating said valve member.

3. A fluid control valve comprising a valve body having a cylinder therein, spaced outlets leading from said cylinder, an inlet leading to said cylinder intermediate said outlets, a tubular connector disposed within said cylinder, a pair of valve members mounted on said connector and spaced from one another to form with said connector a spool valve, apertures within said connector intermediate said valve members in constant open communication with said inlet, a diaphragm closing one end of said cylinder connected on one side thereof to said tubular connector, a fluid passageway within said diaphragm formed in registry with the hollow interior of said connector, a pressurizing chamber formed on the opposite side of said diaphragm, a vent passage leading from said pressurizing chamber, and valve means cooperable with said fluid passageway and said vent passage to control fluid flow therethrough.

4. A fluid control valve comprising a valve body having a cylinder therein, spaced outlets leading from said cylinder, an inlet leading to said cylinder intermediate said outlets, a tubular connector disposed within said cylinder, a pair of valve members mounted on said connector and spaced from one another to form with said connector a spool valve, apertures within said connector intermediate said valve members in constant open communication with said inlet, a diaphragm closing one end of said cylinder connected on one side thereof to said tubular connector, a fluid passageway within said diaphragm formed in registry with the hollow interior of said connector, a pressurizing chamber formed on the opposite side of said diaphragm, a vent passage leading from said pressurizing chamber, and electro-magnetically movable unitary valve means for controlling fluid flow through said fluid passageway and said vent passage.

5. A fluid control valve comprising a valve body having a cylinder therein, spaced outlets leading from said cylinder, an inlet leading to said cylinder intermediate said outlets, a tubular connector disposed within said cylinder, a pair of frustro-conically shaped valve members mounted on said connector and spaced from one another to form with said connector a spool valve, apertures within said connector intermediate said valve members in constant open communication with said inlet, a diaphragm closing one end of said cylinder connected on one side thereof to said tubular connector, a fluid passageway within said diaphragm formed in registry with the hollow interior of said connector, a pressurizing chamber formed on the opposite side of said diaphragm, a vent passage leading from said pressurizing chamber formed in coaxial alignment with said fluid passageway in said diaphragm, a movable valve member cooperable at one end thereof with said fluid passageway and on the other end with said vent passage to control fluid flow therethrough, a shank connected to said valve member and depending therefrom through said vent passage, a snap lever connected at one end thereof to said valve body and the free end thereof to said shank, a snap blade operatively associated with said snap lever connected at one end thereof to said valve body, an overcenter spring interconnecting the free end portions of said snap blade and said snap lever, a motion translation rod connected to said snap blade and depending therefrom, a second diaphragm centrally connected to the depending end of said motion translation rod and peripherally seated on said valve body, spring means biasing said snap blade in one direction, and means for directing pressurized fluid to one side of said second diaphragm to move said diaphragm against the biasing force of said spring means to controllably move said valve member.

6. A fluid control valve comprising a valve body having spaced outlets and an inlet intermediate said outlets, a spool valve within said valve body operable to selectively communicate said inlet with said outlets, a diaphragm connected to said spool valve at one end thereof having an aperture therethrough exposed to the fluid flowing through said inlet, a valve member cooperable with said aperture to control fluid flow therethrough, a snap lever connected at one end thereof to said valve body and at the free end thereof to said valve member, a snap blade operatively associated with said snap lever connected at one end thereof to said valve body, an overcenter spring interconnecting the free end portions of said snap blade and said snap lever operable to maintain said blade and said lever in spaced relation from one another, and means for effecting movement of said snap blade past the plane of said snap lever to move said valve member into and out of engagement with the aperture within said diaphragm.

7. A fluid control valve comprising a valve body having spaced outlets and an inlet intermediate said outlets, a spool valve within said valve body operable to selectively communicate said inlet with said outlets, a diaphragm connected to said spool valve having a fluid passageway therein exposed to the fluid within said inlet, a movable valve member cooperable with said fluid passageway to control fluid flow therethrough, a pressurizing chamber formed on the side of said diaphragm not exposed to the inlet fluid, a snap lever connected at one end thereof to said valve body and at the free end thereof to said valve member, a snap blade operatively associated with said snap lever connected to one end thereof to said valve body, an overcenter spring interconnecting the free end portions of said snap blade and said snap lever to urge the free ends of said blade and said lever in opposed directions, a motion translation rod connected to said snap blade and depending therefrom, a second diaphragm connected to the depending end of said motion translation rod and peripherally seated on said valve body, spring means biasing said snap blade in one direction, and means for directing pressurized fluid to one side of said second diaphragm to move said second diaphragm against the biasing force of said spring means to thereby controllably move said valve member.

8. A fluid control valve comprising a valve body having spaced outlets and an inlet intermediate said outlets, a spool valve within said valve body operable to selectively communicate said inlet with said outlets, a diaphragm connected to said spool valve having a fluid passageway therein exposed to the fluid within said inlet, a movable valve member cooperable with said fluid passageway to control fluid flow therethrough, a pressurizing chamber formed on the side of said diaphragm not exposed to the inlet fluid, a snap lever connected to said valve body and at the free end thereof to said valve member and having a portion extending out of said valve body, a snap blade operatively associated with said snap lever connected to said valve body, a contact blade connected to said valve body having a free end disposed adjacent the free end of said snap lever and having a portion protruding out of said valve body, the protruding portions of said snap lever and said contact blade being adapted to be connected to an electrical energizing circuit, an overcenter spring interconnecting the free end portions of said snap blade and said snap lever to urge the free ends thereof in opposed directions, and means for effecting movement of said snap blade past the plane of said snap lever to move said valve member into and out of engagement with the fluid passageway within said diaphragm and to move the free ends of said snap lever and said contact blade into engagement with one another in one position to close an electrical circuit and to move the free ends of said snap lever and said contact blade out of engagement with one another in another position to open an electrical circuit.

9. A fluid control valve comprising a valve body having spaced outlets and an inlet intermediate said outlets, a spool valve within said valve body operable to selectively communicate said inlet with said outlets, a diaphragm connected to said spool valve having a fluid passageway therein exposed to the fluid within said inlet, a movable valve member cooperable with said fluid passageway to control fluid flow therethrough, a pressurizing chamber formed on the side of said diaphragm not exposed to the inlet fluid, a snap lever connected to said valve body and at the free end thereof to said valve member and having a portion extending out of said valve body, a snap blade operatively associated with said snap lever connected to said valve body, a contact blade connected to said valve body having a free end disposed adjacent the free end of said snap lever and having a portion protruding out of said valve body, the protruding portions of said snap lever and said contact blade being adapted to be connected to an electrical energizing circuit, an overcenter spring interconnecting the free end portions of said snap blade and said snap lever to urge the free ends thereof in opposed directions, a motion translation rod connected to said snap blade and depending therefrom, a second diaphragm connected to the depending end of said motion translation rod and peripherally seated on said valve body, spring means biasing said snap blade in a direction to urge the free end of said snap lever out of engagement with said contact blade to open an electrical energizing circuit, and means for directing pressurized fluid to one side of said second diaphragm to move said second diaphragm against the biasing force of said spring means to thereby controllably move said valve member and to move the free end of said snap lever into engagement with said contact blade to close an electrical energizing circuit.

References Cited in the file of this patent

UNITED STATES PATENTS

| | | |
|---|---|---|
| 1,204,759 | Gray | Mar. 12, 1929 |
| 2,301,916 | Horton | Nov. 17, 1942 |
| 2,641,279 | Baldwin | June 9, 1953 |
| 2,667,180 | Bent | Jan. 26, 1954 |
| 2,771,907 | Joy | Nov. 27, 1956 |
| 2,803,266 | Towler | Aug. 20, 1957 |
| 2,867,236 | Klein | Jan. 6, 1959 |